Patented May 9, 1950

2,507,008

UNITED STATES PATENT OFFICE 2,507,008

PREPARATION OF CUPROUS OXIDE

William J. Harshaw, Shaker Heights, and John O. Hay, Cleveland Heights, Ohio, assignors to The Harshaw Chemical Company, Cleveland, Ohio, a corporation of Ohio No Drawing. Application September 22, 1947, Serial No. 775,570

10 Claims. (Cl. 106—288)

This invention relates to the preparation of cuprous oxide from mixtures of cupric and cuprous oxides.

Heretofore cuprous oxide has been produced commercially by electrolytic and metallurgical processes such as overblowing copper metal or causing copper metal and cupric oxide to react at elevated temperatures. An object of the present process is to produce cuprous oxide equal to the electrolytic cuprous oxide in color, purity and pigment properties at a reduced cost and to produce cuprous oxide which is greatly superior in color and pigment properties to the metallurgical oxides although at somewhat greater cost.

In the recovery of copper from naturally occurring copper metal or scrap copper by leaching with cupric ammonium carbonate solution, a mixture of cuprous and cupric oxides can be formed by distilling the mixture of copper ammonium carbonates. This mixture of copper oxides can be used as the raw material for our present process. The ratio of cupric to cuprous oxide in such raw material may vary greatly, but it is never very close to pure $Cu_2O$. For the purpose of the present process it is desirable to have as a starting material a mixture of copper oxides rich in the cuprous form.

We have discovered a process whereby we are able to obtain practically pure cuprous oxide from the mixture of oxides above indicated by means of sulfuric acid or fluoboric acid. Our novel process consists essentially in contacting a mixture of copper oxides with a suitable amount of one of these acids under suitable conditions. We are not certain of the reactions which occur when the acid is brought into contact with the mixture of oxides in water slurry, but from our experimental work and the behavior which we have observed under various conditions, we believe the following to be at least approximately correct.

The acid (sulfuric or fluoboric) does not apparently make a direct selective leach of the cupric oxide content of mixed oxide. Where the acid hits the surface of the slurry, cupric oxide particles will be dissolved to form water soluble cupric sulfate or cupric fluoborate and the cuprous oxide particles will be decomposed to a very finely divided copper metal (almost colloidal in nature as it requires some time to settle in a beaker of test solution) and water soluble cupric sulfate or cupric fluoborate. Provided the local concentration of the acid is not too great for too long a time this copper will remain in a very reactive colloidal form and can be dispersed throughout the rest of the slurry by stirring. A comparatively rapid reaction then occurs in which the active colloidal copper disappears with the formation of cuprous oxide. The exact mechanism can only be conjectured but seems to involve a reduction of a portion of the cupric sulfate or fluoborate by the active colloidal copper to produce cuprous sulfate or fluoborate which in turn will immediately react with the undissolved cupric oxide or with water to yield cuprous oxide. The following equations indicate the probable reactions although it is likely that there may be some intermediate stages which they do not show.

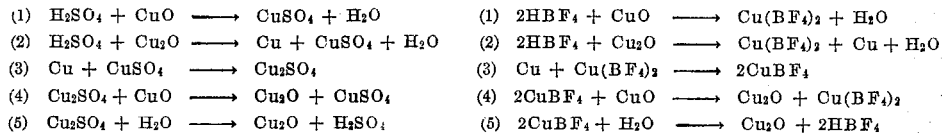

The rapidity of reaction (3) depends on the conditions necessary to cause active colloidal copper to be formed by equation (2). We have found that if copper powder of commerce or copper formed by equation (2) which is flocculent in nature rather than colloidal, be used, equation (3) is very sluggish. As $Cu_2SO_4$ is very readily oxidized, reactions (4) and (5) take place immediately after $Cu_2SO_4$ is formed by equation (3). Powdered copper metal and cupric oxide do not react in water slurry appreciably but they will react slowly in copper sulfate or copper fluoborate solution, which confirms our supposition of an intermediate compound.

If the pH is above 4, a basic copper salt is formed with swelling of the grains and we have different reactions. The basic copper sulfate formed in the process here described is not blue or green but is a brownish red. This may be due to the gelatinous basic cupric salts holding particles of red oxide and mixed oxide and colloidal copper within their structure or it may be partly basic cuprous sulfate or fluoborate. These compounds, of a yellow color, have been reported in the literature. Essentially the same reactions as for the lower pH conditions must be carried out although the equations would be difficult to write because of the unknown structure of the basic cuprous salts or mixtures.

The optimum quantity of sulfuric or fluoboric acid may be calculated as that amount required to convert the CuO to $CuSO_4$ or $Cu(BF_4)_2$. It will be observed that any portion of the acid used in equation (2) either uses up the same number of molecules of CuO in equation (4) as if it had been consumed in equation (1) or is regenerated in equation (5) and thereby free to react according to reaction (1). Because of air oxidation in the ordinary equipment which converts some $Cu_2O$ to CuO it is, in practice, necessary to add an excess of acid over the calculated optimum. The amount of this excess will ordinarily be of the order of about 5 to 50% theoretical required to react with the CuO initially present. Since the excess acid is to compensate for oxidation of $Cu_2O$, the major constituent, the high percentage based upon CuO, a minor constituent, sometimes required is readily understood.

There are two possible schemes for bringing the reactants together. The acid may be added to the slurry of oxides or the acid and slurry may be added simultaneously to the reaction mixture. The third alternative of adding the slurry of mixed oxides to the acid is not practical since the metallic copper is precipitated in a form which does not readily react and go back into solution.

In the first scheme, the addition of sulfuric acid to a slurry of oxide mixture, the first few per cent of the quantity of acid to be employed serve to neutralize the slurry and drop the pH to below 5 and above 4. This is the pH at which the basic copper salt is formed and is maintained until all but about 10% of the acid is in when a sudden break occurs with marked lowering of the pH to about 2.5. The final pH cannot be used to judge accurately the completeness of the reaction because it varies and is apt to increase slightly. We believe this increase indicates some air oxidation of the slurry as it is stirred. The formation of basic salts seems to delay or alter the reactions above indicated but not to change the final result. However, the gelatinous character of the basic salts makes adequate stirring difficult and with the steam attending the reaction forms a tenacious and voluminous foam. Consequently the solutions have to be rather dilute and the addition of acid relatively slow.

In the second scheme, or simultaneous addition, which lends itself more readily to plant practice, it was found advantageous to hold the pH at approximately 3.0 to prevent formation of the basic salts. It can be lowered to 2.5 or raised a few tenths above 3.0 (say 3.3) without substantial formation of basic salts. Below pH 2.5 and especially below 2.2 the acid throws out metallic copper in the more coarsely flocculent form (i. e., heavier particles which tend to form flocs) which is comparatively slow to react with the cupric oxide slurry to make cuprous oxide.

It is obvious that if the slurry of oxides is run in so fast as to form basic salts, the conditions of the previous procedure (adding acid to the slurry of mixed oxides) will be approached more or less. It may thus be said that the pH of the reaction mixture should at the beginning of the reaction or very shortly thereafter be below 4.0 but for best results should never be permitted to go below 2.2.

The reaction temperature depends upon the physical properties desired in the product and normally should be kept between 20° C. and 100° C., preferably between 30° C. and 80° C. At the lower temperatures the color is not as clean a red as at the higher temperatures but at the higher temperatures the particle size tends to be larger with consequent loss of tinting strength. A desirable compromise on these factors seems to be from 30° C. to 80° C.

The reaction mixture should be well stirred to avoid local heterogeneities, especially local areas of excessively low pH which would result in the formation of copper particles difficult to redissolve.

The mixture of copper oxides should be in a finely divided state and if necessary may be ground prior to the treatment with acid. While the initial particle size of the mixed oxide is a factor in the production of a cuprous oxide of a pigment grade, the final particle size may be considerably different and is generally larger depending on other factors involved in the strike. This is a good indication that the reaction involved is not simply the leaching out of cupric oxide from a mixture but is one involving the formation and precipitation of an intermediate compound.

A solution of copper sulfate or fluoborate may be used as a starting solution and may be initially adjusted to a pH of 2.2 to 3.3 with the acid to be used. This feature is desirable in the case of the simultaneous addition of oxide slurry and acid to the reaction mixture. It is not particularly desirable when the acid is added to the oxide slurry although it can be used in that case as well. It is not initially necessary in either case as such a solution obviously will be generated as the reaction proceeds.

The amount of water in the reaction mixture is not critical although there must, of course, be present enough to maintain in solution the soluble cupric salts and produce a thin easily stirred slurry. Too little water is also conducive to foaming, particularly when basic sulfates are present and the use of highly concentrated acid may elevate the temperature too much unless added very slowly. The total water in the batch may be suitably such that there is present one liter of final reaction mixture for each 180 to 280 grams of mixed copper oxides, dry basis.

After the bulk of the acid is in and the pH has dropped to about 2.5, tests are made chemically (after stirring to substantial equilibrium conditions, say 5 to 10 minutes) for cupric oxide and metallic copper. There is a spread between where cupric oxide ceases to be found by rapid "plant type" assay methods and where metallic copper appears of approximately 3.5% of the total acid required. We have found that in this region the product will have a reducing power as $Cu_2O$ of approximately 98%. If after the first trace of copper is apparent upon approaching the end point by addition of acid another 3% of acid (approximately) is added (percentage being based upon the weight of acid present in the reaction mixture at the first appearance of metallic copper in the reaction mixture when the end point is approached by addition of acid) and a substantial but not heavy test for free copper is obtained, the reducing power as $Cu_2O$ of the product can be assured as approximately 99%. Even though this amount of free copper is in the product when filtered, it disappears during the drying so the final product gives a test for metallic copper of none or trace. It seems that this trace of active colloidal copper is used up in counteracting the slight air oxidation attendant on filtering and drying. While this test is not theoretically exact, numerous experiments have shown that an operator skilled in the art can produce substantially uniform results. Samples for testing for the end point should be taken only after stirring for some time after the last addition of reactant until the reaction mixture has reached approximately equilibrium conditions.

It should also be mentioned that if for any reason the end point is overshot by too great an amount by the inadvertent introduction of excess $H_2SO_4$, the addition of more cupric oxide can bring it back. This is a slow reaction if there is much copper in the more coarsely flocculent condition but is fairly rapid otherwise. Of course, such procedure would increase the time of processing and while the chemical composition is rectified, the pigment properties may still vary from a standard because of the differing conditions of the strike.

The $Cu_2O$ may be separated from the liquid portion of the reaction mixture by filtration followed by washing or by successive decantations. Up to this point the cuprous oxide is very susceptible to air oxidation and care must be taken to expose it as little as possible to the atmosphere during filtering and washing. A small proportion of oil (e. g. 0.25 to 0.30% of lubricating oil) or other inhibitor may now be added to protect it from oxidation. This addition may be made in water slurry. When thoroughly stirred in, the oil forms a protective film. The oxide remains wettable with water until dried, after which rewetting becomes difficult.

This cuprous oxide may be filtered on any standard type filter, plate and frame, suction box or continuous, either before or after oiling, provided care is taken not to permit air oxidation during the process.

Drying may be done by usual standard methods but vacuum drying at 125° C. or rapid steam drying at 150° C. in thin layers is to be recommended as causing least oxidation and giving a product of best color. Cuprous oxide produced as above tends, at best, toward a somewhat brownish red color, although it meets navy specifications and has excellent pigment qualities such as covering power and oil absorption.

Where color is important, a calcination of the product under mild reducing conditions will produce a bright red product quite as bright in color as those obtained by the more expensive electrolytic method or by precipitation from alkaline tartrate solutions of copper. Apparently at temperatures between 300° C. and 650° C. there is a final dehydration of the cuprous oxide together with a partial sintering of the porous particles to form a more stable and brighter red product. There is also some microscopic evidence of slight increase in particle size. The preferable temperature is between 450° C. and 550° C. Furthermore, to prevent oxidation of the product and cores of discolored material it is necessary to produce a mildly reducing condition within and incorporated with the cuprous oxide as well as to maintain the furnace atmosphere inert or mildly reducing in character. Methods for producing such furnace atmospheres are known. The problem of incorporating a mild reducing agent in the material is much more difficult. Various reducing agents which might be expected to be satisfactory tend either to reduce the oxide to metallic copper, are not completely decomposed at the optimum temperature of calcination or themselves cause discoloration. It has been found that the desirable conditions can be obtained by treating the oxide preliminary to drying with a minor quantity of certain dilute acids. Presumably they react at the concentrations stated hereinafter to form a small amount of thoroughly dispersed colloidal metallic copper which is capable of reacting at the temperature of calcination either with the oxygen present in the system or with any cupric oxide that may be formed in the handling or initial stages of drying to produce cuprous oxide thus resulting in no contamination of the final product.

Among the acids suitable for accomplishing this result are sulfuric, acetic and fluoboric. Other acids which react with $Cu_2O$ according to the equation $Cu_2O + 2HAc \rightarrow Cu + CuAc + H_2O$ (where Ac is an acid radical) provided the copper salt formed is readily soluble, and that no carbonaceous residue is formed at the temperature of calcination, may be expected to work similarly. Acids such as hydrochloric produce cuprous chloride which contaminates the product; and acids such as nitric exert an oxidizing effect, and these are not suitable.

The amount of acid required varies to some extent with the size of the batch in the kiln, larger batches requiring more and smaller batches less. The concentration of the acid should in the case of acetic be between 2 and 6%, preferably 4–5%, and in the case of sulfuric or fluoboric between 0.5% and 2.5%, preferably .75–1.5%. (The dilution should be such that the pH range is between 1.0 and 3.0, preferably 1.5 to 2.5.) In other words the dilution of each acid should be sufficiently weak so that colloidal copper is produced throughout the mass and not large flocculent particles of copper which would not be satisfactory.

This acid treatment may be applied by slurrying in a tank, filtering and drying. The amount of acid used should produce just sufficient colloidal copper to counteract the oxidizing conditions in the final handling and drying. As these may be expected to vary with the equipment and size of batch, the amount of acid to be used cannot be calculated but must be determined by trial and error for any particular operation, but having been once determined the latitude is such that succeeding runs can be duplicated. In general it is sufficient to treat the final filter cakes of cuprous oxide with just enough of these dilute acids to replace the water in the cake.

The time of calcination is also a factor and we have found optimum conditions require rapid heating as possible up to temperature. At 500° C. the time for calcining a 1000–2000 g. batch is 1 hour, while at 550° C. the color is excellent in 30 minutes. At lower temperatures longer times are necessary to develop the same brightness.

In the event the product is calcined, the oil should be added only after the calcination is complete. This may be accomplished by known methods employing a volatile carrier. Economically it will be recognized that essentially none of the copper in the filtrates or washes need be lost as the more highly concentrated solutions of copper sulfate or fluoborate find direct use in other chemical processes while the copper in the more dilute washes may be precipitated and recovered by known methods.

If it is desired to produce a mixture of $Cu_2O$ and Cu powder, this can be accomplished by utilizing a greater relative proportion of acid to react with the mixed copper oxides. Whereas the greatest quantity of acid we have used in production of $Cu_2O$ is 3% beyond the first appearance of metallic copper under equilibrium conditions, for the production of a mixture of $Cu_2O$ and Cu a proportion of acid in excess of said 3% is used, for example, acid may be used in proportion to produce from say 5% to 90% of metallic copper powder in the product, the remainder being $Cu_2O$. The quantity of excess acid required to give any predetermined proportion of metallic copper in the product can be determined by approaching the end point by small additions of acid and analyzing the product after each. A little experience will make it possible to choose the proper excess with little or no time lost in analyzing the product for end point determination. A fairly close approximation can be had by calculation on the assumption that one equivalent of acid will be required for each equivalent of CuO in the initial mixture and that one equivalent of acid will be required for each equivalent of $Cu_2O$ to be converted to metallic copper.

The following examples will serve to illustrate the invention:

Example I 2500 g. of undried mixed oxide, ratio of approximately 75% $Cu_2O$ and 25% CuO, dry basis, was mixed with 1000 g. of water and ball milled 20 hours. A porcelain 1 gallon mill and flint pebbles were used. The resulting slurry of oxide was put in a 13 liter enamel kettle and diluted to 9000 cc. The temperature was raised to 40° C. and 700 g. of 96% sulfuric acid previously diluted with 700 g. of water was slowly run in while the slurry was well agitated by a wooden sweep. The pH at the end of this addition was 4.1 and the time required was 1 hour 20 minutes. The slurry was adjusted to the end point by chemical tests. This required an additional 354 g. of 96% $H_2SO_4$ (diluted to 48%) and 188 g. of mixed oxide were used to eliminate metallic copper which was formed when the end point was overshot. The time required for adjustment was 5 hours 45 minutes, the temperature was 40–45° C., the final pH 3.1 and both cupric oxide and metallic copper tests were negative. The slurry was filtered on a large (25 cm.) Buchner. The filtration rate was rapid. The volume of filtrate was 10,380 cc. The cake was reslurried in water and stood overnight. This particular slurry was filtered and washed. The total volume of wash being 15,450 cc. and at the end gave a negative test for sulfates. The cake was reslurried in 3000 cc. of water and 3.5 g. of lubricating oil SAE#30 was stirred in for 20 minutes. The oiled slurry was filtered giving a cake of 2290 g. and 3200 cc. of filtrate. The cake was about 73% solids. The cake was dried in a vacuum drier, electrically heated externally at 115°–125° C. and a vacuum of 28½" of Hg. The weight of the dried $Cu_2O$ was 1660 g. and its color was brownish red. It assayed 98.3% $Cu_2O$, no metallic Cu and 88.10% total Cu.

Example II

The oxide (2500 grams of undried mixed oxide) was milled with 1000 g. of water, then washed out of the mill with 2000 g. of water to give a dilution of 2.5 g. wet oxide to 3.0 g. of water. 700 g. of 96% sulfuric acid, estimated to be approximately the theoretical amount required was diluted with 700 g. of water. The volume of the acid was 1011 cc. 5000 cc. of starting solution contained an estimated 675 g. of $CuSO_4.5H_2O$ was put in a 13 liter enamel tank with a wooden sweep agitator revolving at 110 R. P. M. and two wooden baffles. Sufficient acid was run into the solution to lower the pH to 3. The oxide slurry was then started in and the rates of the acid and oxide adjusted to hold the pH between 3 and 2.5. Meanwhile the temperature rose from 11° C. to 30° C. The time required for the initial addition was 70 minutes. At the very end the pH was allowed to drop to 2.2 after the oxide was all in. The temperature was raised to 40° C. and held there by external heat while the tank was continuously agitated. At 1 hour after the addition was complete the pH had risen to 2.5 there was a little free copper by chemical test and no cupric oxide. The color was brick red. At 5 hours there was still a trace of free copper, the pH was still 2.5 and the color was a good orange red. At 21 hours there was no free copper and no cupric oxide by chemical test. The pH was 3.2 and the color was a very clean orange red. Small amounts of 50% sulfuric acid were now added to get a small but definite test for metallic copper with the pH dropping to about 2.4. Acid equivalent to 52 g. of 96% $H_2SO_4$ was used. This adjusting was accomplished at 22 hours after addition of the main bulk of the reagents. The slurry was filtered on a large (24 cm.) Buchner. The filtration rate was rapid. The 9650 cc. of filtrate at 52.92 g./l. of copper and 91.00 g./l. of $SO_4$ contained 511 g. of Cu and 878 g. of $SO_4$. This particular run was washed by reslurrying, filtering and washing on the filter. 8650 cc. of wash was used and it contained 2.76 g./l. Cu or 23.87 Cu and 4.73 g./l. of $SO_4$ or 41 g. of $SO_4$. The filter cake was reslurried in about 1000 cc. of water and 3.5 g. of lubricating oil SAE#30 was added and thoroughly stirred in. The oiled slurry was filtered. The rate was somewhat less than that of the first filtration but was still accomplished in 10–15 minutes. The wet cake measured 24 cm. in diameter by 1.9 cm. The weight was 2293 g. and it contained 74.5% solids. The filtrate was 1850 cc. and contained 0.10 g./l. Cu. The cake was dried in a vacuum drier, electrically heated at 125–150° C. with a vacuum of 28½" mercury for 5 hours and then at 60° C. for overnight. The $Cu_2O$ produced weighed 1706 g. and was brownish red in color. It assayed 98.7% $Cu_2O$, no metallic Cu and 88.15% total Cu.

Example III

In this case 2000 g. of dry oxide was milled with 1000 cc. of water in a 1 gallon mill with flint pebbles for 20 hours.

The oxide was washed out of the mill, filtered and washed to remove ammonium carbonate.

The mixed oxide cake was made up to 4000 cc. of slurry with water in an 8 L beaker, equipped with an agitator.

The slurry was heated to 75° C. and 646.4 g. of 97% $H_2SO_4$ was added dropwise with good agitation. The temperature varied between 75°–80° C. with no external heat, due to the heat of reaction. The addition of the acid required 1 hour 10 minutes. An additional digestion at 75° C. was given for 30 more minutes.

The red oxide was filtered. The filtration was very rapid and the cake was 24 cm. in diameter and about 1½ cm. thick. The cake was washed in the funnel with small amounts of water until a test on the filtrate with $BaCl_2$ showed only a trace of sulfates. The combined filtrate and wash amounted to 7500 cc. and contained 352 g. of copper as $CuSO_4$.

The cake was slurried with 3000 cc. of 5% acetic acid for 30 minutes. It was then filtered and washed on the filter with 1000 cc. of 5° acetic acid. (The amount of acetic acid used was equivalent to 200 cc. of 99.5%.) The filtrate amounted to 3390 cc. and contained 48.4 g. of copper and by calculation this copper required 91.4 g. of acetic acid. The rest of the acid was free in the filtrate or cake.

The acid wet cake was pulled as dry as possible and without washing was charged in a 75 mm. glass tube. Nitrogen was passed over it and the temperature was raised to 500° in about 30 minutes. This temperature was maintained for 1 hour and the tube was cooled with $N_2$ still passing.

The product weighed 1300 g. and was of a good red color throughout.

It was readily disintegrated to a fine bright red powder in a mortar. The analysis of a composite of this oxide and that from a duplicate run was 99.9% $Cu_2O$, 0.4% metallic Cu and 88.34% total Cu.

Having thus described our invention, what we claim is:

1. A process of obtaining cuprous oxide from a mixture of cuprous and cupric oxides comprising introducing such mixture of oxides into an aqueous reaction medium, introducing into such medium an acid of the class consisting of sulfuric and fluoboric acids the time of introduction and quantities of said oxides and said acid being controlled to maintain a pH above 2.2, the total quantity of acid being from 5% to 50% in excess of the theoretical quantity required to react with the CuO initially present in said mixture of oxides to form the corresponding cupric salt, and separating the cuprous oxide from the liquid portion of the reaction mixture.

2. A process of obtaining cuprous oxide from a mixture of cuprous and cupric oxides comprising contacting said mixture in aqueous medium with a quantity, approximately as required to react with the cupric oxide content of said mixture plus the cupric oxide formed during the process, of an acid of the class consisting of sulfuric and fluoboric acids while agitating and maintaining the reaction mixture at all times above pH 2.2, finishing the reaction between pH 2.2 and pH 3.3 and separating the cuprous oxide from the liquid portion of the reaction mixture.

3. The process set forth in claim 1 wherein further the resulting cuprous oxide having mixed therewith a dilute aqueous solution of an acid of the class consisting of sulfuric, fluoboric and acetic, said solution having a pH from 1.0 to 3.0, is separated from any such excess of said dilute aqueous solution of acid as would be removed by filtration but leaving enough to moisten the mass and is then calcined within a temperature range from 300° C. to 650° C. until a marked color change from brownish red to a brighter red is produced.

4. The process set forth in claim 1 wherein further the resulting cuprous oxide having mixed therewith a dilute aqueous solution of an acid of the class consisting of sulfuric, fluoboric and acetic, said solution having a pH from 1.0 to 3.0, is separated from any such excess of said dilute aqueous solution of acid as would be removed by filtration but leaving enough to moisten the mass and is then calcined within a temperature range from 450° C. to 550° C. until a marked color change from brownish red to a brighter red is produced.

5. The process set forth in claim 2 wherein further the resulting cuprous oxide having mixed therewith a dilute aqueous solution of an acid of the class consisting of sulfuric, fluoboric and acetic, said solution having a pH from 1.0 to 3.0, is separated from any such excess of said dilute aqueous solution of acid as would be removed by filtration but leaving enough to moisten the mass and is then calcined within a temperature range from 450° C. to 550° C. until a marked color change from brownish red to a brighter red is produced.

6. A process according to claim 2 wherein the mixture of cuprous and cupric oxides in water slurry and the acid are simultaneously introduced into a reaction vessel at relative rates to maintain the pH at all times between 2.2 and 3.3.

7. A process according to claim 2 wherein the mixture of cupric and cuprous oxide is first made into a water slurry in the reaction vessel and the acid is then added to such slurry, with agitation, to a final pH between 2.2 and 3.3.

8. A process according to claim 1 wherein the reaction temperature is kept between 20° C. and 100° C.

9. A process according to claim 1 wherein the reaction temperature is kept between 30° C. and 80° C.

10. A process for producing a mixture of $Cu_2O$ and metallic copper in a fine state of subdivision comprising contacting in aqueous medium at a pH above 2.2 a mixture of CuO and $Cu_2O$ in aqueous medium with an acid of the class consisting of sulfuric and fluoboric in quantity approximating the molecular equivalent of CuO in the mixture of CuO and $Cu_2O$ plus the molecular equivalent of $Cu_2O$ desired to be converted to metallic copper.

WILLIAM J. HARSHAW.
JOHN O. HAY.

REFERENCES CITED

The following references are of record in the file of this patent:

Mellor's Modern Inorganic Chemistry, Parkes and Mellor, Longmans, Green and Company, New York, 1939, page 588.

Mellor: Comprehensive Treatise on Inorganic and Theoretical Chemistry, vol. III, Longmans, Green and Company, New York, 1923, pages 121 and 125.